(12) United States Patent
Stenfort

(10) Patent No.: US 9,383,795 B2
(45) Date of Patent: Jul. 5, 2016

(54) STORAGE DEVICE POWER FAILURE INFRASTRUCTURE

(71) Applicant: Seagate Technology LLC, Cupertino, CA (US)

(72) Inventor: Ross John Stenfort, Los Altos, CA (US)

(73) Assignee: Seagate Technololgy LLC, Cupertino, CA (US)

( * ) Notice: Subject to any disclaimer, the term of this patent is extended or adjusted under 35 U.S.C. 154(b) by 133 days.

(21) Appl. No.: 14/201,106

(22) Filed: Mar. 7, 2014

(65) Prior Publication Data

US 2014/0258755 A1 Sep. 11, 2014

Related U.S. Application Data

(60) Provisional application No. 61/775,651, filed on Mar. 10, 2013.

(51) Int. Cl.
*G06F 11/00* (2006.01)
*G06F 1/30* (2006.01)

(52) U.S. Cl.
CPC ........................................ *G06F 1/30* (2013.01)

(58) Field of Classification Search
CPC .......................................................... G06F 1/30
USPC .................................... 714/14, 22, 23, 24, 15
See application file for complete search history.

(56) References Cited

U.S. PATENT DOCUMENTS

| 9,143,005 | B1 * | 9/2015 | Laird | H02J 9/00 |
| 2010/0284117 | A1 * | 11/2010 | Crane | B63H 21/20 361/93.1 |
| 2010/0332858 | A1 * | 12/2010 | Trantham | G06F 1/30 713/300 |
| 2010/0332862 | A1 * | 12/2010 | Lester | G06F 1/30 713/300 |

\* cited by examiner

*Primary Examiner* — Dieu-Minh Le
(74) *Attorney, Agent, or Firm* — Taylor English Duma, LLP

(57) ABSTRACT

A power fail protection system wherein pluralities of individual energy storage components are electrically connected to one or more SSD drives during a power failure though a power switch matrix. Typically an individual high-energy supply will be connected to one SSD drive during a power failure. The power fail protection system may also test the transient energy response of individual energy storage components, or include an imminent power fail warning connected directly to an SSD drive interface. Some embodiments further provide for identifying, reporting, and replacing weak energy storage components. High-energy supplies may be modular, or hot swappable.

22 Claims, 8 Drawing Sheets

STORAGE DEVICE POWER FAILURE INFRASTRUCTURE

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 61/775,651, filed Mar. 10, 2013, first named inventor Ross John STENFORT, and entitled STORAGE DEVICE POWER FAILURE INFRASTRUCTURE.

BACKGROUND

1. Field

Advancements in protecting data on one or more solid state drives during a power failure are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

Figure 1:
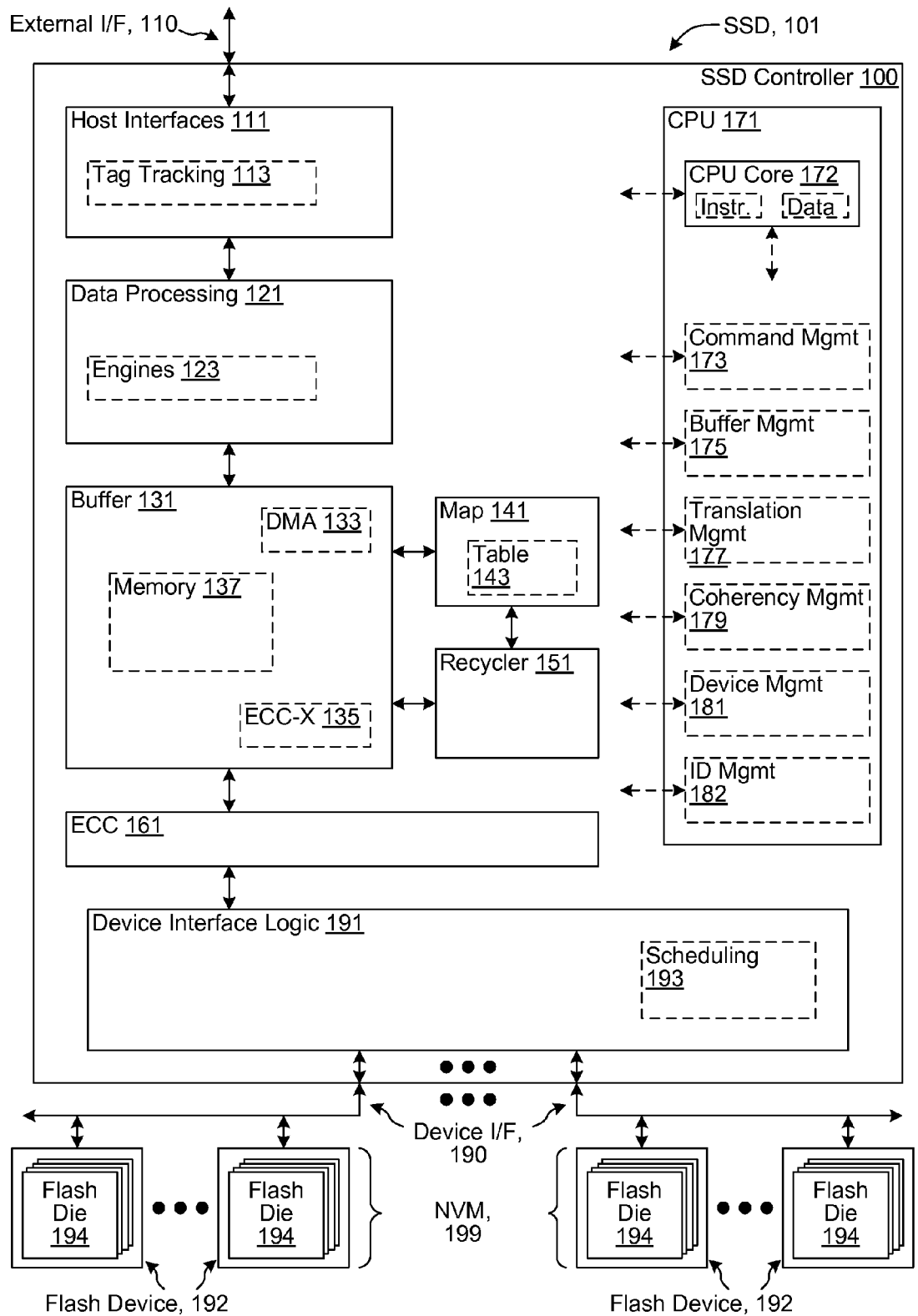
FIG. 1 illustrates an embodiment of a Solid-State Disk (SSD) having an SSD controller using an imminent power fail warning signal (IPFWS) informing a central processing unit (CPU) that a power failure is imminent.

| Ref. Symbol | Element Name |
| --- | --- |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
|---|---|
| CPU | Central Processing Unit |
| CSDA | Computer System Data Availability |
| Device I/F | Device Interface |
| DMA | Direct Memory Access |
| DSA | Data Storage Array |
| ECC | Error Correction Code |
| External I/F | External Interface |
| ESC/ESCs | Ensergy Source Component/Energy Source Components |
| HVMD | Highly Valued Memory Device |
| IPFWS | Imminent Power Fail Warning Signal |
| LBA/LBAs | Logical Block Address/Logical Block Addresses |
| PFPE | Power Fail Protection Efficiency |
| PFPC/PFPCs | Power Fail Protection Circuit/Power Fail Protection Circuits |
| PFPS | Power Fail Protection System |
| PFPRF | Power Fail Protection Redundancy Factor |
| PSM | Power Switch Matrix |
| PTC | Power Test Circuitry |
| SSD | Solid state drive |
| Super Cap | Super Capacitor |

Power Failure Protection Overview

Methods and architectures for preventing data loss during a power failure with a lower cost, reduced component count, and increased reliability as compared to conventional SSD power fail protection solutions improve the power fail protection efficiency (PFPE) for SSD drives.

New architectures that increase reliability, serviceability, Computer System Data Availability (CSDA), and PFPE are enabled by moving Super Caps or emergency power sources from inside an SSD drive to another place in a computer system or storage array.

New architectures in some embodiments include multiple Energy Storage Components (ESCs), devices capable of acting as a high energy supply for a short duration, where each ESC may include, but are not limited to, using one or more or combination of: capacitors (such as Tantalum capacitors, and/or so-called Super Capacitors), batteries, or other alternate temporary power supply. Any individual ESC must be capable of powering an SSD for a minimum specified time that is long enough for an SSD drive to migrate all data residing in its volatile memory to its non-volatile memory.

One way to test any particular ESC is to use a power switch module (PSM) to connect and discharge that ESC to a known load and monitor the voltage provided to the load over time or at a specific time. If any particular ESC is weak or defective it will not be able maintain the load voltage above a minimum specified voltage for a specified time. In the embodiments illustrated herein, such loads are illustrated as being resistive, but the techniques illustrated are also applicable to other impedance type loads.

A power fail protection circuit (PFPC) is a collection of circuits comprising multiple ESC, a PSM, and power test circuitry (PTC). The PFPC embodiments illustrated herein have the ability to test any individual ESC, and electrically connect each ESC to an SSD drive during a power failure. A power fail protection system (PFPS) is a scalable system and method for protecting data on one or more SSD drives.

In some embodiments, the PFPC detects and reports weak ESC to the computer system or system operator in various ways. For example, in some embodiments, the PFPC further comprises an interface capable of sending a maintenance request message to the computer system. In other embodiments, an LED panel or other human readable display identifies any weak ESC that needs service. Some PFPC embodiments include modular ESC that are enabled to be swapped out without interrupting the computer system or data storage array. In such modular ESC embodiments, the weak ESC are enabled to be readily field replaceable quickly after they are identified.

Multiple ESC combined with a PSM, switchable PTC, and multiple SSD forms a PFPS that increases PFPE and CSDA. A goal of some redundant ESC embodiments is to have a sufficient ESC reserve capacity, such that removal of a single ESC (such as for testing or replacement) does not adversely impact the data hardening capabilities of the system. This enables early detection, servicing, and/or replacement of weak ESCs before failure without impacting CSDA.

In "single-SSD-sized ESC" embodiments, each ESC is "sized" to provide temporary power sufficient for data hardening of a single SSD. In such embodiments, there will be a respective single-SSD-sized ESC for each SSD in the system plus at least one more single-SSD-sized ESC. In such embodiments, during a power failure a PSM will electrically connect one ESC to a single SSD.

PSM complexity increases with the number of possible electrical connections, the number of ESCs, and the number of SSD drives in the PFPS. In a basic PFPS implementation of a single-SSD-sized ESC embodiment, a PSM is enabled to connect a particular SSD to one ESC or to a second ESC. In more general PFPS implementations of single-SSD-sized ESC embodiments, the PSM is enabled to connect any SSD of the PFPS to any ESC of the PFPS.

For single-SSD-sized redundant ESC embodiments, the concept of a power fail protection redundancy factor (PRPF) is herein defined as the number of spare ESC in a PFPC over the number of SSD drives serviced by that PFPC. Thus, a PFPS containing 6 ESC and 5 SSDs has a PFPRF of ⅕.

In "multiple-SSD-sized" redundant ESC embodiments, each ESC is sized to provide temporary power sufficient for data hardening of two or more SSD. In such multiple-SSD-sized ESC embodiments, what matters is that the aggregate capacity of the ESCs remaining in-service is sufficient to support the data hardening of the system's SSDs.

The PSM and ESCs are buildable according to embodiment into any available space in or near a computer system or data storage array. In one embodiment, multiple ESCs and a PSM are built into a standard drive form factor, enabling installation into a drive slot of the standard form factor. In other embodiments, the ESCs are built into a power supply, or located elsewhere in the system.

In some embodiments internal SSD circuitry is used to generate an SSD-internal imminent power fail warning signal (IPFWS). The IPFWS signals a SSD Controller of the SSD to begin data hardening operations. In SSD-internal-power-switch embodiments, the IPFWS further enables the SSD to switch from normal power provided by a regular power supply to temporary power provided by an ESC (externally connected, or integral to the SSD).

In other embodiments IPFWS is externally generated (with respect to the SSD, such as by the regular power supply) and routed to a plurality of SSDs, reducing or eliminating the need for IPFWS generation circuitry on each of the SSD. In some embodiments the SSD-externally generated IPFWS is also provided to the PFPC. Upon IPFWS assertion, each SSD begins to move data from volatile memory to non-volatile memory. In embodiments where the IPFWS is power-supply generated and arrives sufficiently in advance of actual loss of the regular power supply, the SSDs with IPFWS-inputs are enabled to transfer at least some data residing in volatile memory to non-volatile memory using the normal power provided by the regular power supply (and without reliance on ESC(s)).

In SSD-internal-power-switch embodiments, an SSD-externally generated IPFWS further enables the SSD to switch from normal power provided by a regular power supply to temporary power provided by a PSM. In SSD-external power-switch embodiments, an SSD-externally generated IPFWS is also provided to the PFPC, and the PSM not only selects the ESC to connect with each SSD, but also performs (external to the SSD) the switching from the normal power provided by the regular power supply to the temporary power provided by the selected ESC. According to embodiment, these two switch functions (switching among the ESCs, and switching with respect to the regular poser supply) can be done in a single switch stage or in multiple switch stages.

According to embodiment, an externally generated (with respect to the SSD) IPWFS is routed to the SSD through an industry standard interface (such as SATA, envmhci, SCSI, SAS, USB3, SOP, and others mentioned elsewhere herein) using a vendor unique control pin, a reserved pin, an unused pin, or an unused power supply pin. The routing of an IPFWS to the SSD is however not limited to using an industry standard interface.

In some embodiments, SSDs provided with IPWFS are enabled to perform data hardening (flushing of data) before power fail and without reliance on the use of ESCs. The ability to perform data hardening without use of an ESC has the advantages of reduced component count, reduced cost, increased reliability, and freed board space (enabling other functionality, or implementation in a smaller form factor). In some embodiments, the data hardening writes all data buffered in volatile storage to non-volatile storage. In some embodiments the data hardening includes saving off all write data for which good status has been returned on the interface and meta data. According to embodiment, the saved write data includes many sectors (or sector equivalents) of data.

In some embodiments, PFPCs are controlled by a controller (a microprocessor or other form of state machine) enabled to perform one or both of the testing of the ESC and the operational connection of the ESCs to the SSD drives at the onset of a power failure. In some embodiments, the PFPCs are also enabled to communicate ESC diagnostic information to other electronic systems or to a human readable display.

The power failure infrastructure taught herein scales from the smallest computer system to largest data center. An exemplary small computer system or data storage array comprises one SSD drive, a PSM, and two ESC. An exemplary large computer systems or data storage array comprises multiple PFPCs, each PFPC having a PSM, multiple ESCs, and multiple SSD drives. Regardless of the system size, each SSD in the computer system or data storage array will be powered by at least one ESC long enough to move all data from volatile memory to non-volatile memory.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system, comprising:
one or more solid state drives;
a plurality of energy storage components;
switching circuitry selectively connecting the one or more solid state drives to at least some of the plurality of energy storage components; and
wherein in the presence of a least an unavailable one of the plurality of energy storage components, via the switching circuitry, available ones of the plurality of energy storage components are enabled during a power failure to provide short-term power sufficient to enable data hardening on the one or more solid state drives.

EC2) The system of EC1, wherein one or more of the energy storage components comprise capacitors implemented as hot-swappable removable modules comprising functional status visual indicators.

EC3) The system of EC1, wherein the capacitors comprise tantalum capacitors.

EC4) The system of EC1, wherein the capacitors comprise supercapacitors.

EC5) The system of EC1, wherein the one or more solid state drives are two or more solid state drives.

EC6) The system of EC1, wherein the data hardening comprises writing data buffered in volatile storage to non-volatile storage.

EC7) The system of EC1, wherein the at least an unavailable one of the plurality of energy storage components was previously determined to be malfunctional.

EC8) The system of EC1, wherein the at least an unavailable one of the plurality of energy storage components is at least temporarily out-of-service.

EC9) The system of EC1, wherein the at least an unavailable one of the plurality of energy storage components is undergoing a maintenance test.

EC10) The system of EC1, wherein the plurality of energy storage components are comprised within the one or more solid state drives.

EC11) The system of EC10, wherein the plurality of energy storage components and the data hardening ability are provided via a field upgrade of the one or more solid state drives.

EC12) The system of EC10, wherein the data hardening ability is a latent feature of the one or more solid state drives and the feature is enabled by later providing the plurality of energy storage components via a field upgrade where the plurality of energy storage components are not provided initially.

EC13) The system of EC1, wherein the plurality of energy storage components are located within the system separately from the one or more solid state drives.

EC14) The system of EC13, wherein the plurality of energy storage components are located within the system to avoid heat.

EC15) The system of EC13, wherein the energy storage components enable the data hardening ability without requiring volume allocation with respect to the one or more solid state drives.

EC16) The system of EC15, wherein the one or more solid state drives are enabled to be smaller without compromising the data hardening ability.

EC17) The system of EC13, wherein the plurality of energy storage components are located in the coolest place within the system and separate from the one or more solid state drives.

EC18) The system of EC13, wherein the data hardening ability is a latent feature of the one or more solid state drives, the feature is enabled by the presence of the plurality of energy storage components, and the plurality of energy storage components are enabled to be provided as a subsequent field upgrade with respect to an earlier deployment of the plurality of storage drives.

EC19) The system of EC1, wherein the plurality of energy storage components are comprised in a first part within the one or more solid state drives and in a second part separate from the one or more solid state drives.

EC20) The system of EC19, wherein the data hardening ability in the presence of the at least one unavailable one of the energy storage components is a latent feature of the one or more solid state drives and the feature is enabled by later providing the second part via a field upgrade where the second part are not provided initially.

EC21) The system of EC19, wherein the one or more solid state drives comprise respective power interfaces enabling connection of the one or more solid state drives and the second part.

EC22) The system of EC21, wherein each power interface comprises a connector compatible with at least one version of a serial advanced technology attachment (SATA) standard and installation of the second part is communicated to the one or more solid state drives via a predetermined manipulation of one or more pins of the connector.

EC23) The system of EC22, wherein the one or more pins, subject to the predetermined manipulation, comprise at least pin P11.

EC24) The system of EC1, wherein the plurality of energy storage components are collectively implemented in a common housing compatible with a selected drive form factor, the one or more solid state drives are respectively compatible with the selected drive form factor, and the common housing of energy storage components and the one or more solid state drives are removably mountable in respective drive bays of a multiple-drive-bay enclosure.

EC25) The system of EC24, wherein the multiple-drive-bay enclosure comprises inter-drive-bay wiring enabling connection of each of the one or more solid state drives, the plurality of energy storage components, and the switching circuitry.

EC26) The system of EC24, wherein the multiple-drive-bay enclosure comprises a plurality of drive bays enabled to implement a just a bunch of disks (JBOD) array.

EC27) The system of EC24, wherein the multiple-drive-bay enclosure comprises a plurality of drive bays enabled to collectively implement at least one redundant array of independent disks (RAID) array and further comprises an additional drive bay for the common housing.

EC28) The system of EC24, wherein the data hardening ability is a latent feature of the one or more solid state drives and the feature is enabled by later providing the plurality of energy storage components, comprised in the common housing, via a field upgrade where the plurality of energy storage components are not provided initially.

EC29) The system of EC24, wherein the one or more solid state drives comprise respective power interfaces enabling connection of the one or more solid state drives, the plurality of energy storage components, and the switching circuitry.

EC30) The system of EC29, wherein the each power interface comprises a connector compatible with at least one version of a serial advanced technology attachment (SATA) standard and installation of the plurality of energy storage components is communicated to the one or more solid state drives via a predetermined manipulation of one or more pins of the connector.

EC31) The system of EC30, wherein the one or more pins, subject to the predetermined manipulation, comprise at least pin P11.

EC32) The system of EC1, wherein a count of the plurality of energy storage components is in excess number relative to a count of the one or more solid state drives.

EC33) The system of EC32, wherein the excess number of the plurality of energy storage components provides increased availability via redundancy and during the power failure each of the one or more solid state drives is connected to a respective one of the available ones of the plurality of energy storage components.

EC34) The system of EC1, wherein the ratio of number of the plurality of energy storage components to the number of the one or more solid state drives is greater than one.

EC35) The system of EC34, wherein the ratio of the number of the plurality of energy storage components to the number of the one or more solid state drives is a non-integer.

EC36) The system of EC34, wherein the ratio of number of the plurality of energy storage components to the number of the one or more solid state drives is an integer.

EC37) The system of EC1, wherein an excess in capacity of the available ones of the plurality of energy storage components, relative to the needs of the one or more solid state drives, enables more frequent testing of the energy storage components without compromising I/O operation performance and without compromising the data hardening ability.

EC38) The system of EC1, wherein an excess in capacity of the available ones of the plurality of energy storage components, relative to the needs of the one or more solid state drives, enables more convenient and efficient servicing of the energy storage components without compromising the data hardening ability.

EC39) The system of EC1, wherein an excess in capacity of the available ones of the plurality of energy storage components, relative to the needs of the one or more solid state drives, enables scheduling replacement of at least a determined malfunctional one of the energy storage components at the convenience of service personnel without any compromise in the data hardening ability.

EC40) The system of EC1, wherein the one or more solid state drives comprise a plurality of solid state drives and a count of the plurality of solid state drives is in excess number relative to a count of the available ones of the plurality of energy storage components, an excess in capacity of the available ones of the plurality of energy storage components exists relative to the needs of the one or more solid state drives, and during the power failure at least some of the available ones of the energy storage components are connected to two or more of the plurality of solid state drives.

EC41) The system of EC39, wherein the ratio of number the one or more solid state drives to the number of the plurality of energy storage components is greater than one.

EC42) The system of EC41, wherein the ratio is two.

EC43) The system of EC1, wherein one or more of the energy storage components comprise electrochemical capacitors.

EC44) The system of EC1, wherein one or more of the energy storage components comprise supercapacitors.

EC45) The system of EC1, wherein one or more of the energy storage components comprise batteries.

EC46) The system of EC1, wherein one or more of the energy storage components comprise rechargeable batteries.

EC47) The system of EC1, wherein one or more of the energy storage components comprise a hybrid combination of at least two technologies selected from electrochemical capacitors, supercapacitors, batteries, and rechargeable batteries.

EC48) The system of EC1, wherein the energy storage components are not soldered in place.

EC49) The system of EC1, wherein the energy storage components are removable modules.

EC50) The system of EC49, wherein the removable modules are slot insertable.

EC51) The system of EC49, wherein the removable modules are receptacle pluggable.

EC52) The system of EC49, wherein the removable modules are field mateable with compatible interfaces comprised by a power supply sub-system of the system.

EC53) The system of EC49, wherein the removable modules are field mateable with compatible interfaces comprised by the first plurality of solid state drives.

EC54) The system of EC49, wherein the removable modules are hot-swappable.

EC55) The system of EC49, wherein the removable modules comprise functional status visual indicators.

EC56) The system of EC1, wherein the system is comprised in at least part of an enterprise server.

EC57) The system of EC1, wherein the system is comprised in an equipment rack of an enterprise data center.

EC58) The system of EC1, wherein the system is comprised in a desktop computer.

EC59) The system of EC1, wherein the system is comprised in a laptop computer.

EC60) The system of EC1, wherein the switching circuitry is enabled to receive power, and respective power status, sourced by the plurality of energy storage components and a nominal power source, to appropriately switch the received power to a power output based on the received power status, and to generate a power-failure-imminent signal based at least in part on a determination that the nominal power is failing.

EC61) The system of EC60, wherein the hardening of the data is initiated in response to an assertion of the power-failure-imminent signal.

EC62) The system of EC60, wherein the power-failure-imminent signal is further based at least in part on a determination that the user has initiated an immediate power off of the power supply.

EC63) The system of EC62, wherein the power-failure-imminent signal is asserted in advance of the determination that the nominal power is failing.

EC64) The system of EC62, wherein the data hardening is initiated at a time sufficiently early to enable the data hardening to complete without reliance on availability of one or more of the plurality of energy storage components.

EC65) The system of EC64, wherein reliability is increased by avoiding the reliance.

EC66) The system of EC62, wherein the user initiated the immediate power off via a system power switch.

EC67) The system of EC1, wherein the switching circuitry is external to one or more solid state drives.

EC68) The system of EC67, wherein the one or more solid state drives comprise respective power interfaces enabling connection of the one or more solid state drives to receive the switched power and power-failure-imminent signal output by the switching circuitry.

EC69) The system of EC68, wherein the power interface comprises a connector compatible with at least one version of a serial advanced technology attachment (SATA) standard and the power-failure-imminent signal is received via pin 11 of the connector.

EC70) The system of EC1, wherein the switching circuitry is at least in part implemented internal to at least one of the one or more solid state drives.

EC71) The system of EC70, wherein the part of the switching circuitry implemented internal to the at least one of the one or more solid state drives provides the power output and the power-failure-imminent signal to a respective controller of the at least one of the one or more solid state drives.

EC72) The system of EC70, wherein the data hardening ability is a latent feature of each controller of the one or more solid state drives, and the feature is enabled, by later providing the plurality of energy storage components, via a field upgrade where not provided initially.

EC73) The system of EC1, further comprising:

load discharge test circuitry enabled to perform a periodic determination of the functional status of each of the plurality of energy storage components by observing a discharge performance during a respective periodic connection of each of the plurality of energy storage components to a predetermined test load.

EC74) The system of EC73, wherein the periodic determination is made during normal operation of the one or more solid state drives.

EC75) The system of EC73, wherein suspension of I/O operations, of the one or more solid state drives, is not a requirement of performing the periodic determination.

EC76) The system of EC73, wherein I/O operations of the one or more solid state drives are enabled to continue during the periodic determination and without compromising the data hardening ability.

EC77) The system of EC73, wherein I/O operation performance, of the one or more solid state drives, is unaffected by the periodic determination and without compromising the data hardening ability.

EC78) The system of EC73, wherein I/O operation performance, of the one or more solid state drives, is independent of the periodic determination without compromising the data hardening ability.

EC79) The system of EC78, wherein the periodic determination is performed a plurality of times daily.

EC80) The system of EC78, wherein the periodic determination is performed hourly.

EC81) The system of EC73, wherein the predetermined test load comprises a size chosen to stressfully test the plurality of energy storage components with the goal of determining likely failures earlier than if the size were chosen to avoid stress of the plurality of energy storage components.

EC82) The system of EC73, wherein the predetermined test load comprises a size chosen to implement the periodic determining faster than if the size were chosen to avoid stress of the plurality of energy storage components.

EC83) The system of EC73, wherein an excess in capacity of the plurality of energy storage components, relative to the needs of the one or more solid state drives, enables sizing the predetermined test load to stressfully test the plurality of energy storage components without compromising the data hardening ability.

EC84) The system of EC73, wherein an excess in capacity of the plurality of energy storage components, relative to the needs of the one or more solid state drives, enables sizing the predetermined test load to shorten test time required by the periodic determination without compromising the data hardening ability.

EC85) The system of EC73, wherein based at least in part on the periodic determination, the load discharge test circuitry is enabled to selectively communicate the functional status to at least a corresponding one of the plurality of energy storage components.

EC86) The system of EC85, wherein at least some of the second plurality of energy storage components comprise at least one functional status visual indicator controlled at least in part based on the functional status determined by the load discharge test circuitry.

EC87) The system of EC73, wherein based at least in part on the periodic evaluation, the load discharge test circuitry is enabled to selectively communicate the functional status, for at least a corresponding one of the second plurality of energy storage components, to a host enabled to log the functional status.

EC88) The system of EC87, wherein the host is remote.

EC89) A method, comprising:

periodically evaluating each a plurality of energy storage components with respect to an ability to maintain a minimum voltage under a test load over a test time;

dynamically connecting, in view of a shutdown of a nominal power supply and the periodically evaluating, evaluated-as-good ones of the plurality of energy storage components to a plurality of storage drives; and data hardening by each of the plurality of storage drives, subsequent to the nominal power supply shutdown, using reserve power supplied from the dynamically connected ones of the plurality of energy storage components.

EC90) The method of EC89, wherein the plurality of storage drives comprise one or more solid state drives and the one or more of the energy storage components comprise supercapacitors implemented as hot-swappable removable modules comprising functional status visual indicators.

EC91) The method of EC89, wherein the data hardening ability is a latent feature of the plurality of storage drives, the feature is enabled by the presence of the plurality of energy storage components, and the plurality of energy storage components are enabled to be provided via a field upgrade at a time after an initial deployment of the plurality of storage drives.

EC92) The method of EC89, further comprising:

generating at least one power status signal in accordance with predetermined criteria;

communicating the at least one power status signal to at least some of the plurality of storage drives via a pin on a standard computer interface;

operating the plurality of storage drives in an operating mode determined based at least in part on changes in the power status signal; and wherein the functionality of the pin is configured during system initialization for at least some of the plurality of storage drives.

EC93) The method of EC92, wherein the at least one power status signal is an imminent-power-fail signal based at least in part on the status of the nominal power supply and the operating mode comprises performing the data hardening in response to the imminent-power-fail signal indicating the loss of the nominal power supply.

EC94) The method of EC92, wherein the at least one power status signal is a reserve power ready signal based at least in part on the ready status of at least one of the plurality of energy source components and the operating mode comprises deferring one or more operations in response to reserve power ready signal indicating a lack of readiness.

EC95) The method of EC89, wherein the data hardening comprises writing data buffered in volatile storage to non-volatile storage.

EC96) The method of EC89, wherein the plurality of storage drives comprise one or more solid state drives.

EC97) The method of EC89, wherein the plurality of storage drives comprise one or more rotating disk drives.

EC98) The method of EC89, wherein the plurality of storage drives comprise one or more storage drives comprising at least one rotating disk and at least one flash memory used at least some of the time for user data storage.

EC99) The method of EC89, wherein one or more of the energy storage components comprise electrochemical capacitors.

EC100) The method of EC89, wherein one or more of the energy storage components comprise supercapacitors.

EC101) The method of EC89, wherein one or more of the energy storage components comprise batteries.

EC102) The method of EC89, wherein one or more of the energy storage components comprise rechargeable batteries.

EC103) The method of EC89, wherein one or more of the energy storage components comprise a hybrid combination of at least two technologies selected from electrochemical capacitors, supercapacitors, batteries, and rechargeable batteries.

EC104) The method of EC89, wherein the energy storage components are not soldered in place.

EC105) The method of EC89, wherein the energy storage components are removable modules.

EC106) The method of EC89, wherein a count of the plurality of energy storage components is in excess number relative to a count of the plurality of storage drives.

EC107) The method of EC106, wherein the excess number of the plurality of energy storage components provides increased availability via redundancy.

EC108) The method of EC106, wherein the excess number of the plurality of energy storage components enables more frequent testing of the energy storage components without compromising I/O operation performance and without compromising the data hardening ability.

EC109) The method of EC106, wherein the excess number of the plurality of energy storage components enables more faster testing of the energy storage components, through the use of a test load size larger than if the size were chosen to avoid stress of the plurality of energy storage components, and without compromising the data hardening ability.

EC110) The method of EC89, wherein the periodically evaluating is via load discharge test circuitry.

EC111) The method of EC89, wherein the dynamically connecting is via a power switch matrix.

EC112) The method of EC89, wherein the data hardening is managed by a solid state drive controller of each of the solid state drives.

EC113) The method of EC89, further comprising:
reporting, in a log, evaluated as bad ones of the plurality of energy storage components.

EC114) The method of EC89, further comprising:
selectively changing the state of at least one visual indicator, in view of the periodically evaluating, to identify at least a respective evaluated as bad one of the plurality of energy storage components.

EC115) The method of EC89, wherein the at least one visual indicator is one of a plurality of visual indicators comprised in respective ones of the plurality of energy storage components.

EC116) The method of EC89, further comprising:
hot-swapping out evaluated as bad ones of the plurality of energy storage components.

EC117) The method of EC89, further comprising:
controlling the power switch matrix at least in part via comparator circuitry monitoring at least a voltage of the nominal power supply.

EC118) The method of EC89, further comprising:
generating a power status signal.

EC119) The method of EC89, wherein generating of the power status signal is based at least in part on a voltage decrease by the nominal power supply.

EC120) The method of EC89, wherein generating of the power status signal is based at least in part on sensing a current draw.

EC121) The method of EC118, further comprising:
initiating the data hardening in response to the power status signal.

EC122) The method of EC118, wherein the power status signal is an imminent-power-failure signal.

EC123) The method of EC89, wherein, for each of the plurality of storage drives, the dynamically connecting is further via a respective reserve power connector separate from a respective nominal power connector.

EC124) The method of EC123, further comprising:
communicating the power status signal to at least some of the plurality of storage drives via a pin on the reserve power connector.

EC125) The method of EC89, further comprising:
communicating the power status signal to at least some of the plurality of storage drives via a pin on a standard computer interface.

EC126) The method of EC125, wherein the standard computer interface is compatible with at least one version of a serial advanced technology attachment (SATA) standard and the imminent-power-failure signal is received via pin P11.

EC127) The method of EC125, wherein the pin is one of a vendor unique control pin, a reserved pin, an unused pin, or an unused power supply pin.

EC128) The method of EC125, wherein for at least some of the plurality of storage drives the interpreted functionality of the pin is configured during manufacturing.

EC129) The method of EC124, wherein for at least some of the plurality of storage drives the interpreted functionality of the pin is configured during system initialization.

EC130) The method of EC89, further comprising:
further generating the power status signal via the comparator circuitry based at least in part on monitoring a user operated power-off switch;
wherein in response to assertion of the user operated power-off switch the power status signal communicates a power loss event in advance of a shutdown of the nominal power supply; and
wherein the data hardening occurs without reliance on the energy storage components.

EC131) The method of EC89, further comprising:
generating a power status signal via the comparator circuitry based at least in part on respective voltages of the plurality of energy source components.

EC132) The method of EC131, further comprising:
determining an operating mode of the plurality of storage drives based at least in part on the power status signal.

EC133) The method of EC132, wherein the determined operating mode comprises deferring one or more operations.
EC134) The method of EC132, wherein the determined operating mode comprises inhibiting spin up.
EC135) The method of EC131, wherein the power status signal is a reserve power ready signal.
EC136) The method of EC131, further comprising:
communicating the power status signal to at least some of the plurality of storage drives via a pin on a standard computer interface.
EC137) The method of EC136, wherein the standard computer interface is compatible with at least one version of a serial advanced technology attachment (SATA) standard and the imminent-power-failure signal is received via pin P11.
EC138) The method of EC136, wherein the pin is one of a vendor unique control pin, a reserved pin, an unused pin, or an unused power supply pin.
EC139) The method of EC136, wherein the functionality of the pin is configured during manufacturing for at least some of the plurality of storage drives.
EC140) The method of EC136, wherein the functionality of the pin is configured during system initialization for at least some of the plurality of storage drives.
EC141) The method of EC89, further comprising:
charging each of the plurality of energy source components, at least subsequent to the periodic evaluating of each, for at most predetermined time-out interval;
ending the charging before the time-out interval based at least in part on the power status signal.
EC142) The method of EC89, wherein the data hardening ability is a latent feature of the plurality of storage drives and the feature is enabled by later providing the plurality of energy storage components via a field upgrade where the plurality of energy storage components are not provided initially.
EC143) The method of EC89, wherein the plurality of energy storage components are located within the system separately from the plurality of storage drives.
EC144) The method of EC143, wherein the plurality of energy storage components are located within the system to avoid proximate heat sources.
EC145) The method of EC143, wherein the energy storage components enable the data hardening ability without requiring volume allocation with respect to the plurality of storage drives.
EC146) The method of EC143, wherein the data hardening ability is a latent feature of the plurality of storage drives and the feature is enabled by later providing the plurality of energy storage components via a field upgrade where the plurality of energy storage components are not provided initially.
EC147) The method of EC89, wherein the plurality of energy storage components are comprised within the plurality of storage drives.
EC148) The system of EC147, wherein the data hardening ability is a latent feature of the plurality of storage drives and the feature is enabled by later providing the plurality of energy storage components via a field upgrade where the plurality of energy storage components are not provided initially.
EC149) The method of EC89, wherein the plurality of energy storage components are collectively implemented in a common housing compatible with a selected drive form factor, the plurality of storage drives are respectively compatible with the selected drive form factor, and the common housing of energy storage components and the plurality of storage drives are removably mountable in respective drive bays of a multiple-drive-bay enclosure.
EC150) The method of EC149, wherein the data hardening ability is a latent feature of the plurality of storage drives and the feature is enabled by later providing the plurality of energy storage components, comprised in the common housing, via a field upgrade where the plurality of energy storage components are not provided initially.
EC151) The method of EC89, wherein the plurality of energy storage components are comprised in a first part within the plurality of storage drives and in a second part separate from the plurality of storage drives.
EC152) The method of EC151, wherein the data hardening ability in the presence of the at least one unavailable one of the energy storage components is a latent feature of the plurality of storage drives and the feature is enabled by later providing the second part via a field upgrade where the second part are not provided initially.
EC153) A system, comprising:
means for periodically evaluating each a plurality of energy storage components with respect to an ability to maintain a minimum voltage under a test load over a test time;
means for dynamically connecting, in response to a shutdown of a nominal power supply and based on results from the means for periodically evaluating, evaluated-as-good ones of the plurality of energy storage components to a plurality of storage drives; and
means for data hardening by each of the plurality of storage drives, subsequent to the nominal power supply shutdown, using reserve power supplied from the dynamically connected ones of the plurality of energy storage components.
EC154) The system of EC153, further comprising:
means for reporting evaluated-as-bad ones of the plurality of energy storage components.
EC155) The system of EC153, further comprising:
means for selectively changing the state of at least one visual indicator, in view of the periodically evaluating, to identify at least a respective evaluated-as-bad one of the plurality of energy storage components.
EC156) The system of EC153, further comprising:
means for generating a power status signal;
means for communicating the power status signal to at least some of the plurality of storage drives.
EC157) The system of EC156, further comprising:
means for further generating the power status signal via the comparator circuitry based at least in part on monitoring a user operated power-off switch;
wherein in response to assertion of the user operated power-off switch the power status signal communicates a power loss event in advance of a shutdown of the nominal power supply; and
wherein the data hardening occurs without reliance on the energy storage components.
EC158) The system of EC153, wherein the data hardening writes data buffered in volatile storage to non-volatile storage.
EC159) The system of EC153, wherein the plurality of storage drives comprise one or more solid state drives.
EC160) The system of EC153, wherein at least some of the energy storage components comprise supercapacitors.
EC161) The system of EC153, wherein the energy storage components are removable modules.

EC162) The system of EC153, wherein a count of the plurality of energy storage components is in excess number relative to a count of the plurality of storage drives.

EC163) The system of EC162, wherein the excess number of the plurality of energy storage components provides increased availability via redundancy.

EC164) The system of EC153, wherein the plurality of energy storage components are located within the system separately from the plurality of storage drives.

EC165) The system of EC164, wherein the plurality of energy storage components are located within the system to avoid proximate heat sources.

EC166) The system of EC164, wherein the data hardening ability is a latent feature of the plurality of storage drives and the feature is enabled by later providing the plurality of energy storage components via a field upgrade where the plurality of energy storage components are not provided initially.

EC167) The system of EC153, wherein the plurality of energy storage components are comprised within the plurality of storage drives.

EC168) The system of EC167, wherein the data hardening ability is a latent feature of the plurality of storage drives and the feature is enabled by later providing the plurality of energy storage components via a field upgrade where the plurality of energy storage components are not provided initially.

EC169) The system of EC153, wherein the plurality of energy storage components are collectively implemented in a common housing compatible with a selected drive form factor, the plurality of storage drives are respectively compatible with the selected drive form factor, and the common housing of energy storage components and the plurality of storage drives are removably mountable in respective drive bays of a multiple-drive-bay enclosure.

EC170) The system of EC169, wherein the data hardening ability is a latent feature of the plurality of storage drives and the feature is enabled by later providing the plurality of energy storage components, comprised in the common housing, via a field upgrade where the plurality of energy storage components are not provided initially.

System Context

In some embodiments, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, a flash interface for interfacing with flash memory, and circuitry for controlling the interfaces and performing (and/or controlling various aspects of the performing) compressing and uncompressing, and transferring data residing in volatile memory to non-volatile memory during a power failure or an imminent power failure warning signal (IPFWS).

According to various embodiments, some host interfaces are compatible with one or more of a USB interface standard (USB3, USB2, or otherwise), a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, a PCIe interface standard, and a SCSI over PCIe (SOP) interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1 illustrates selected details of an embodiment of an SSD including an SSD controller providing fractional higher-level redundancy for NVMs (e.g. flash memories, such as NAND flash memories). The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Figure 2:
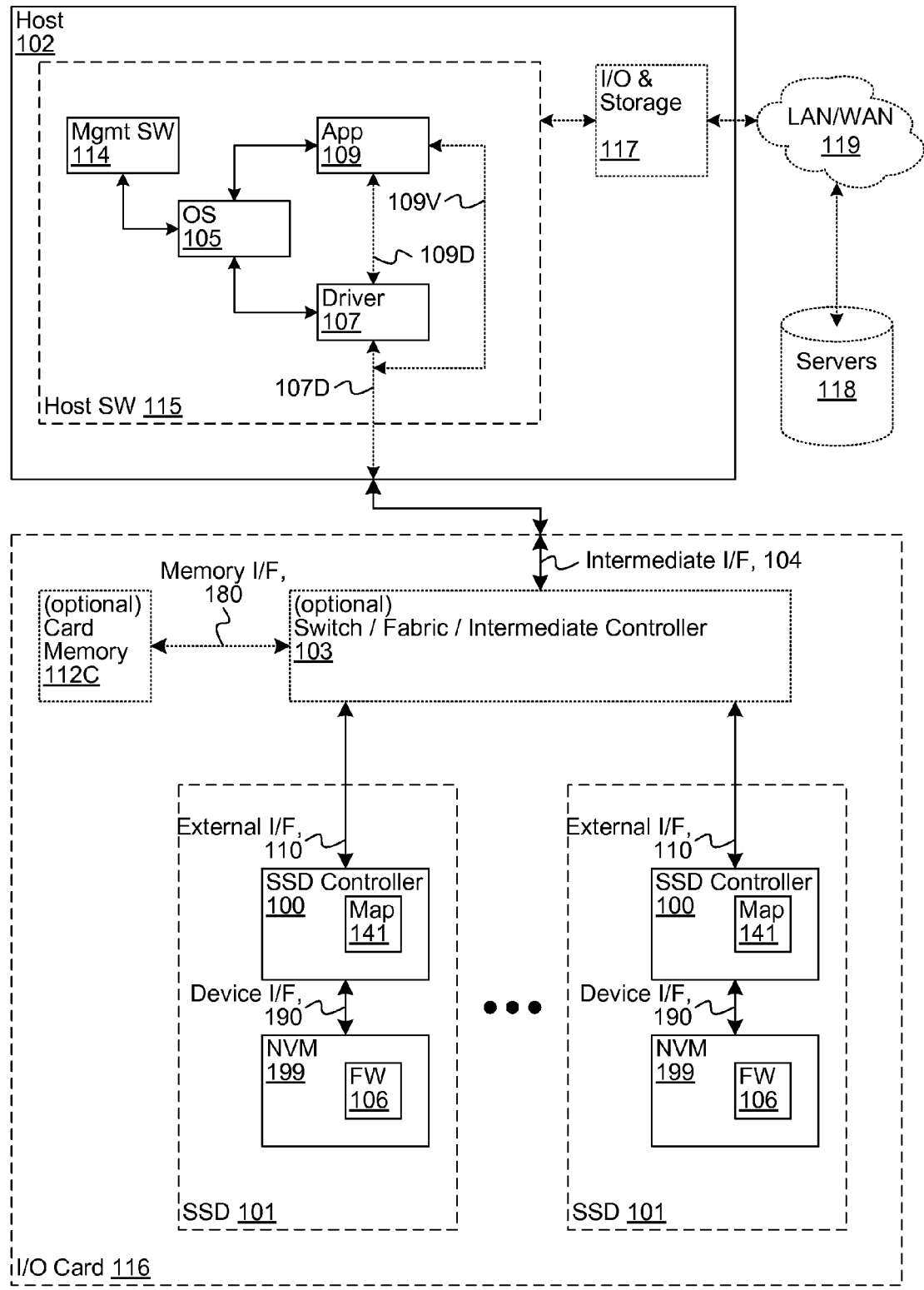
FIG. 2 illustrates an embodiment of a system incorporating the SSD of FIG. 1.

Continuing in FIG. 1, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 2 are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE, such as fractional RASIE and/or non-fractional RASIE, described in further detail elsewhere herein); with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC

161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 2).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

FIG. 2 illustrates selected details of various embodiments of systems including one or more instances of the SSD of FIG. 1. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 2). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1) is implemented partially via software on a host and partially via a combination of firmware and hardware in an SSD controller. For another example, functionality of or associated with a recycler unit (such as similar to Recycler 151 of FIG. 1) is implemented partially via software on a host and partially via hardware in a computing-host flash memory controller.

Power Failure Protection Sub-Systems and Operations

Figure 3:
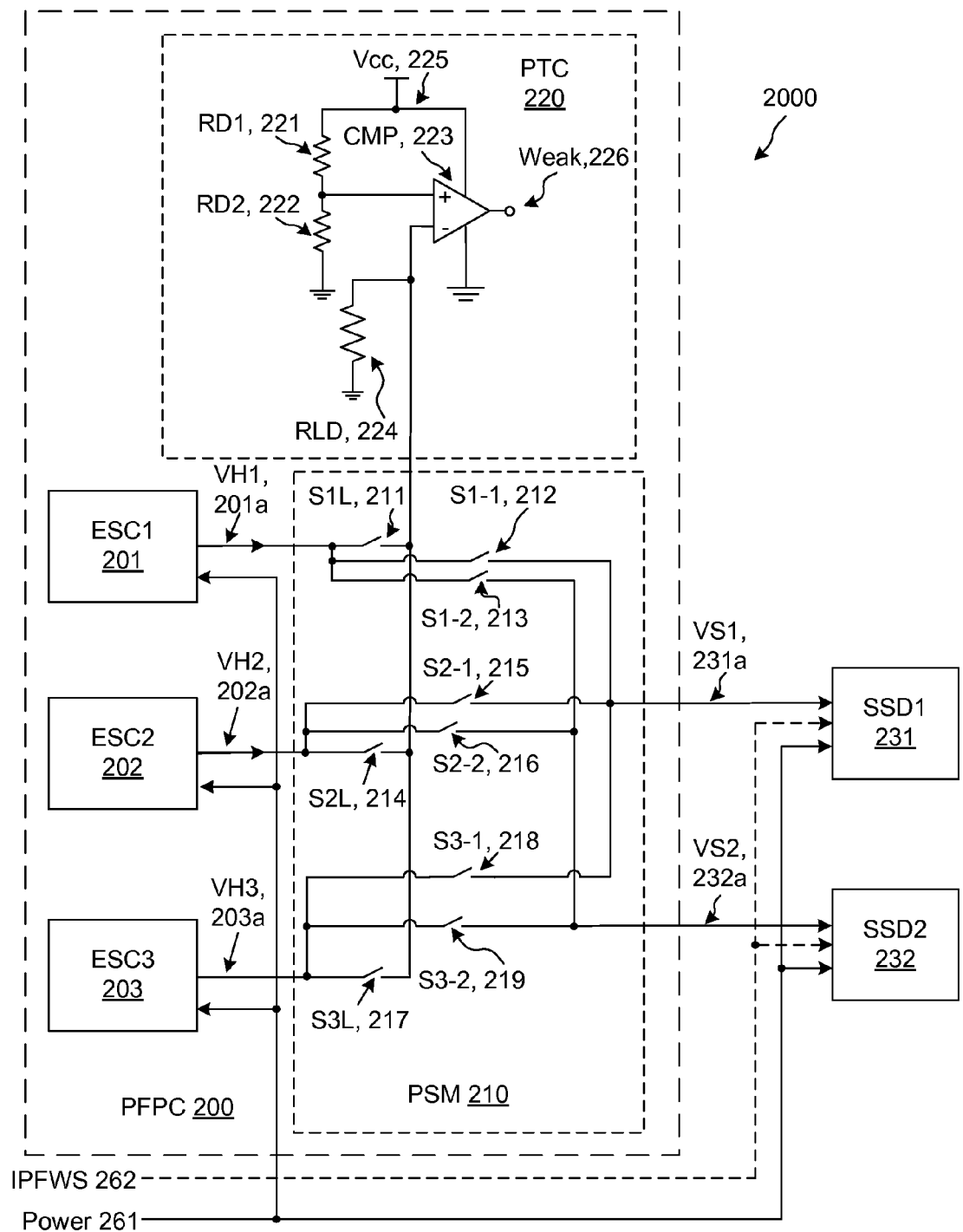
FIG. 3 illustrates an embodiment of a system having three energy storage components (ESCs), a power switch matrix (PSM), two SSDs, and power test circuitry (PTC).

FIG. 3 shows an embodiment of a sub-system 2000 comprising a PFPC 200 connected to SSD drives SSD1 231 and SSD2 232. PFPC 200 comprises three ESC (ESC1 201, ESC2 202, and ESC3 203), PSM 210, and PTC 220. A first plurality of switches of PSM 210 comprises three switch pairs, S1-1 212 and S1-2 213, S2-1 215 and S2-2 216, and S3-1 218 and S3-2 219, which respectively enable ESC1 201, ESC2 202, and ESC2 203 to connect to and provide temporary power to a selected one or more of SSD1 231 or SSD2 232. A second plurality of switches of PSM 210, S1L 211, S2L 214, and S3L 217, respectively enable ESC1 201, ESC2 202, and ESC2 203 to connect to load RLD 224 for periodic discharge load testing.

Normal power from a regular power supply, Power 261, and an imminent power fail warning signal, IPFWS 262, are provided to the SSDs and each SSD has circuitry to switch to temporary power provided by one or more of the ESCs during a loss of normal power. (FIG. 8 explicitly illustrates circuitry internal to an SSD for switching between normal and temporary power.) In some embodiments, IPFWS 262 is not provided externally to the SSDs, but is instead generated internally, as provided below in the discussions of FIGS. 4 and 8.

In some embodiments, in which the SSD does not have integral circuitry to switch to temporary power, PSM 210 is enabled to also switch Power 261 to the SSDs, for example, as a function of IPFWS 262. According to embodiment, such SSD-external switching is performed in a second stage switch after the switching between the ESC, or in a unified switch stage with the ESC (such as otherwise provided by SSD-internal PSM 710, as provided below in the discussion of FIG. 4).

PTC 220 comprises comparator CMP 223, voltage divider network RD1 221 and RD2 222, test load RLD 224, and output Weak signal 226. Comparator CMP 223 compares a reference voltage on its positive input to the voltage across load RLD 224 on its negative input. A voltage across load RLD 224 below the voltage on the positive input of comparator CMP 223 results in assertion of output signal Weak 226, indicating that the ESC under test is weak (and likely should be replaced).

The reference voltage on the positive input of comparator CMP 223 is provided by voltage divider network resistors RD1 221 and RD2 222, respectively connected to a supply voltage VCC and ground GND 240. The negative input on comparator CMP 223 is connected to load RLD 224, respectively via S1L through S3L, to the output of one or more of ES1 through ES3 (VH1 201*a*, VH2 202*a*, and VH3 203*a* respectively). Closing S1L 211 connects VH1 201*a* to load RLD 224. Closing S2L 214 connects VH2 202*a* to load RLD 224. Closing S2L 217 connects VH3 203*a* to load RLD 224. In at least some embodiments, one ESC is connected to load RLD 224 at a time. It is understood that in some embodiments the illustrated topology with respect to the coupling of the ESC to the regular power supply is simplified in that each ESC is isolated from the regular power supply during its respective testing.

According to embodiment and ESC capacity, a given ESC is enabled to be connected to a single SSD at a time, or a given ESC is enabled to be connected to multiple SSD. Temporary power (such as for data hardening during loss of a nominal power supply) is provided to SSD1 from one or more of ESC1 201, ESC2 202, and ESC3 203, via the respective closing of S1-1 212 (connecting VH1 201*a* to VS1 231*a*), S2-1 215 (connecting VH2 202*a* to VS1 231*a*), and S3-1 218 (connecting VH3 203*a* to VS1 231*a*). Temporary power is provided to SSD2 from one or more of ESC1 201, ESC2 202, and ESC3 203, via the respective closing of S1-2 213 (connecting VH1 201*a* to VS2 232*a*), S2-2 216 (connecting VH2 202*a* to VS2 232*a*), and S3-2 219 (connecting VH3 203*a* to VS2 232*a*).

Figure 4:
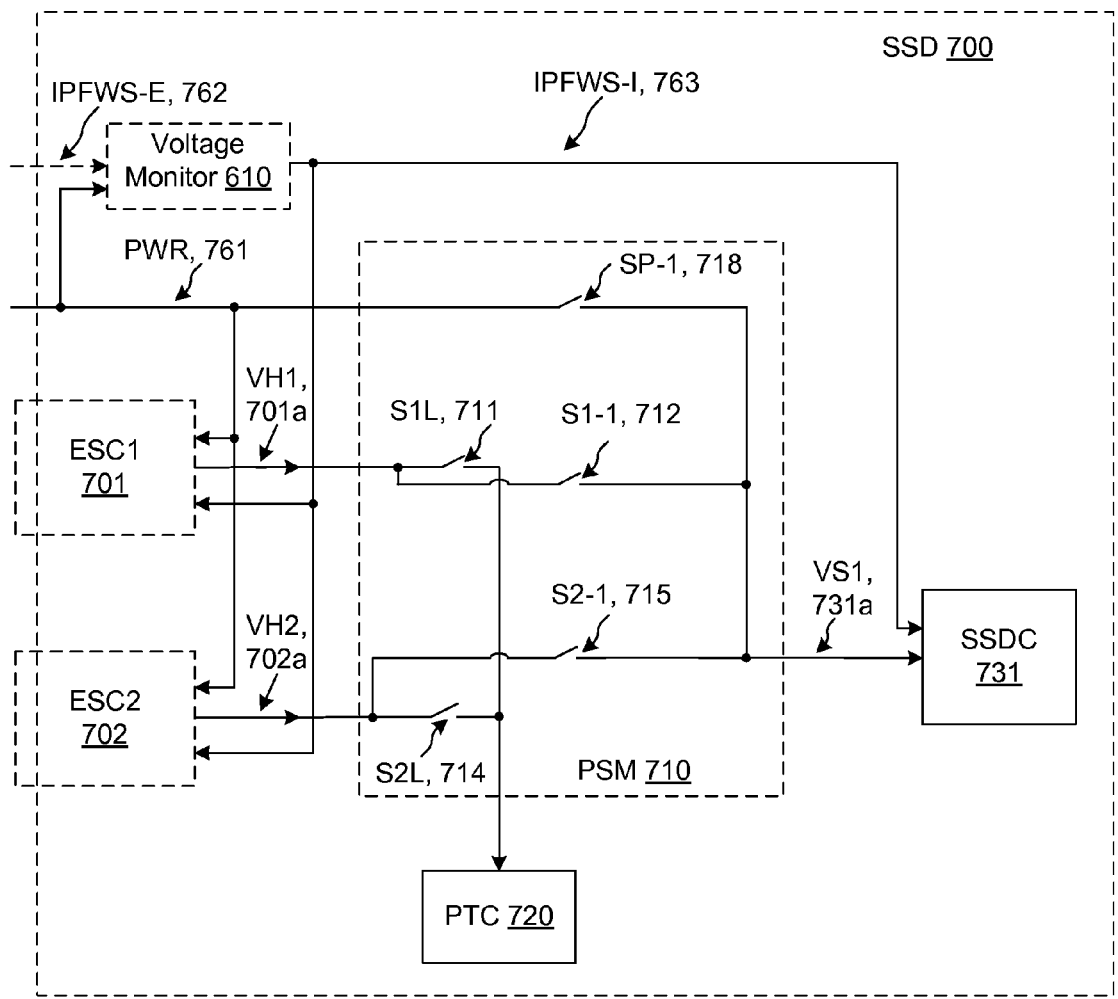
FIG. 4 illustrates an embodiment of an SSD having two energy storage components (ESCs), a power switch matrix (PSM), and power test circuitry (PTC).

FIG. 4 illustrates an embodiment of an SSD 700 having energy storage components ESC1 701 and ESC2 702, a power switch matrix PSM 710, power test circuitry PTC 720, and SSD Controller SSDC 731. Operating in a generally similar manner to PSM 210 of FIG. 3, PSM 710 is enabled to switch among normal power, PWR 761, and the two ESCs to supply the one SSDC 731. PTC 720 operates the same as PTC 220 of FIG. 3. SSDC 731, PSM 710, and PTC 720 are integrated within SSD 700.

According to embodiment, an external imminent power fail warning signal, IPFWS-E 762, is also provided to SSD 700; or an internal imminent power fail warning signal, IPFWS-I 763, is generated by Voltage Monitor 610. Voltage Monitor 610 operates as provided below in the discussion of FIG. 8. (If IPFWS-E 762 is provided, it is routed internally just as IPFWS-I 763 is shown, and Voltage Monitor 610 is not used.) PSM 710 thus switches SSDC 731 to temporary power (provided by one or more of the ESCs) during a loss of normal power (as indicated by an IPFWS assertion).

In some embodiments SSDC 731, PSM 710, and PTC 720 are soldered to a common printed circuit board. In FIG. 4, modules ESC1 701 and ESC2 702 are intentionally shown extending beyond the boundary (representing an enclosure) of SSD 700 to suggest that in at least some embodiments one or more of the modules are removably insertable, while the enclosure of SSD 700 otherwise remains closed. According to embodiment, one or more of ESC1 701 and ESC2 702 are provided as a field upgrade. According to other embodiments, ESC1 701 and ESC2 702 are generally flush with the enclosure when inserted, are contained within the enclosure (boundary) of SSD 700, and/or insertion and/or removal of ESC1 701 and ESC2 702 requires opening the enclosure of SSD 700.

Figure 5:
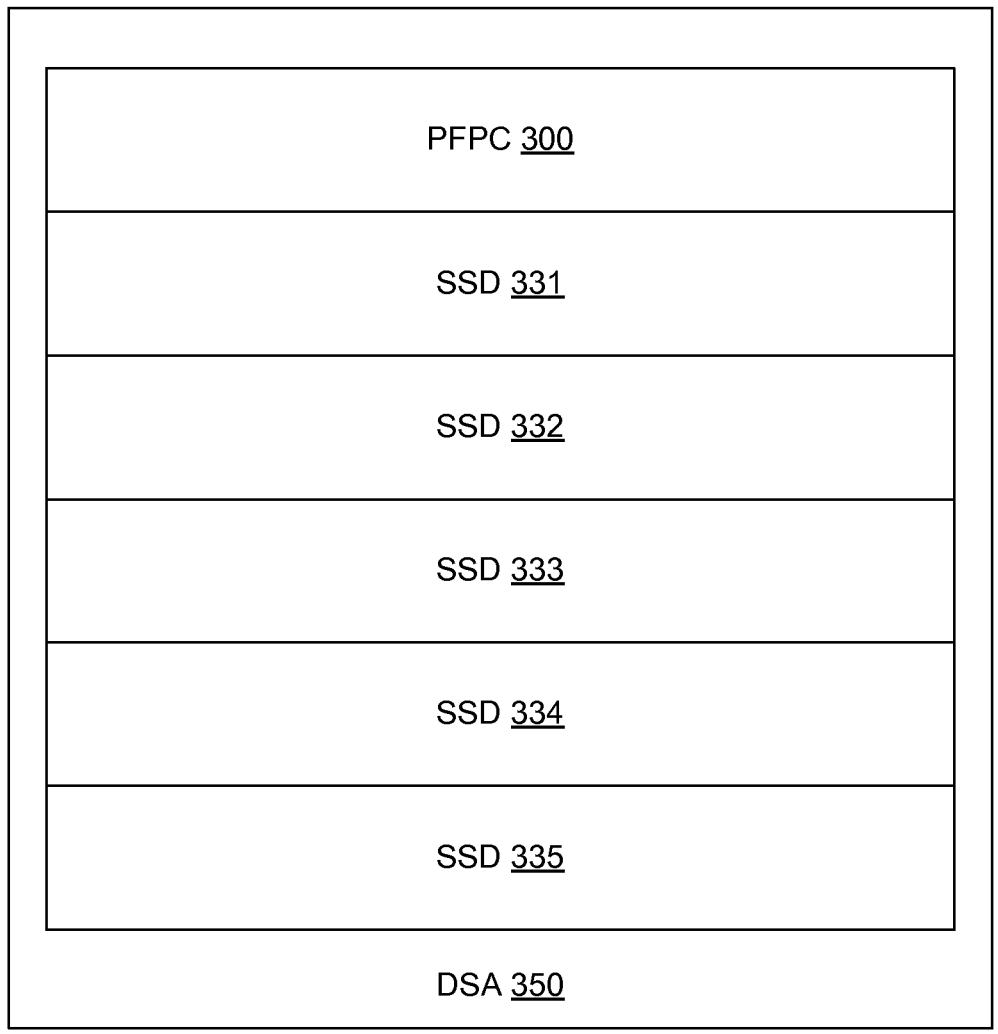
FIG. 5 illustrates an embodiment of a system having power fail protection circuit (PFPC), and multiple SSD drives built in a data storage array (DSA).

The data storage array (DSA 350) in FIG. 5 comprises six slots (a.k.a. bays) into which have been operatively inserted PFPC 300 and five SSD drives (331, 332, 333, 334, and 335, respectively). PFPC 300 provides power fail protection redundancy by comprising one more ESC than the number of SSDs in DSA 350. Thus as illustrated, PFPC 300 comprises six ESC and provides a PFPRF of ⅕. According to embodiment, PFPC 300 is enabled to be a field upgrade to DSA 350, wherein PFPC 300 is plugged into a slot otherwise enabled to receive a further SSD drive, and DSA 350 further comprises cabling enabled to connect PFPC 300 to each of SSD 331 through SSD 335.

Figure 6:
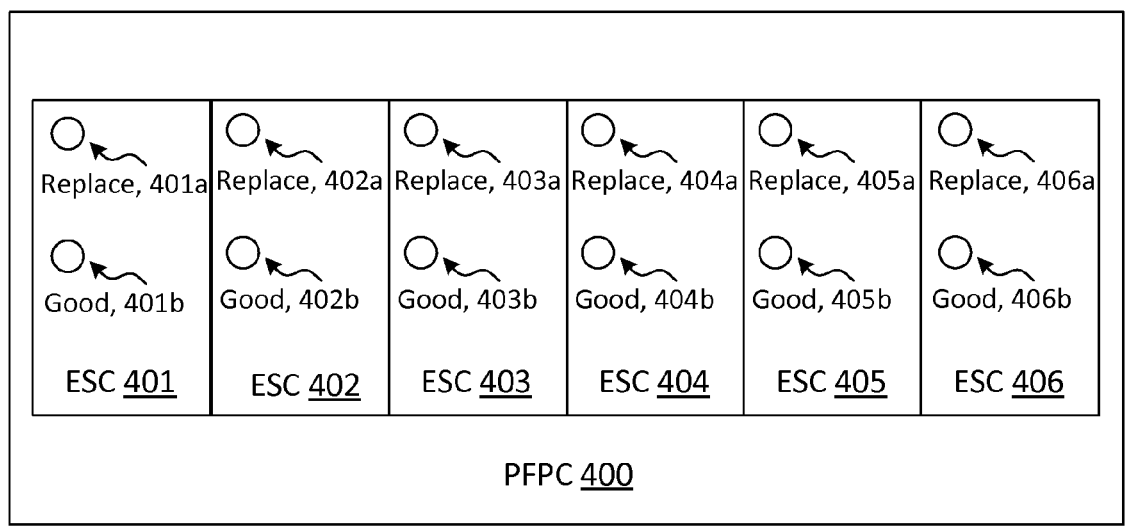
FIG. 6 illustrates an embodiment of a system having PFPC with multiple ESC including human readable status indicators Replace and Good.

The PFPC 400 in FIG. 6 comprises modules ESC 401, 402, 403, 404, 405, and 406. Each of these ESC modules is enabled to be replaced without interrupting an associated data storage array protected by the PFPC 400, thus enhancing CSDA. Each of ESC 401 through ESC 406 comprises two human readable indicators, Replace (respectively 401a, 402a, 403a, 404a, 405a, and 406a) and Good (respectively 401b, 402b, 403b, 404b, 405b, and 406b).

Figure 7:
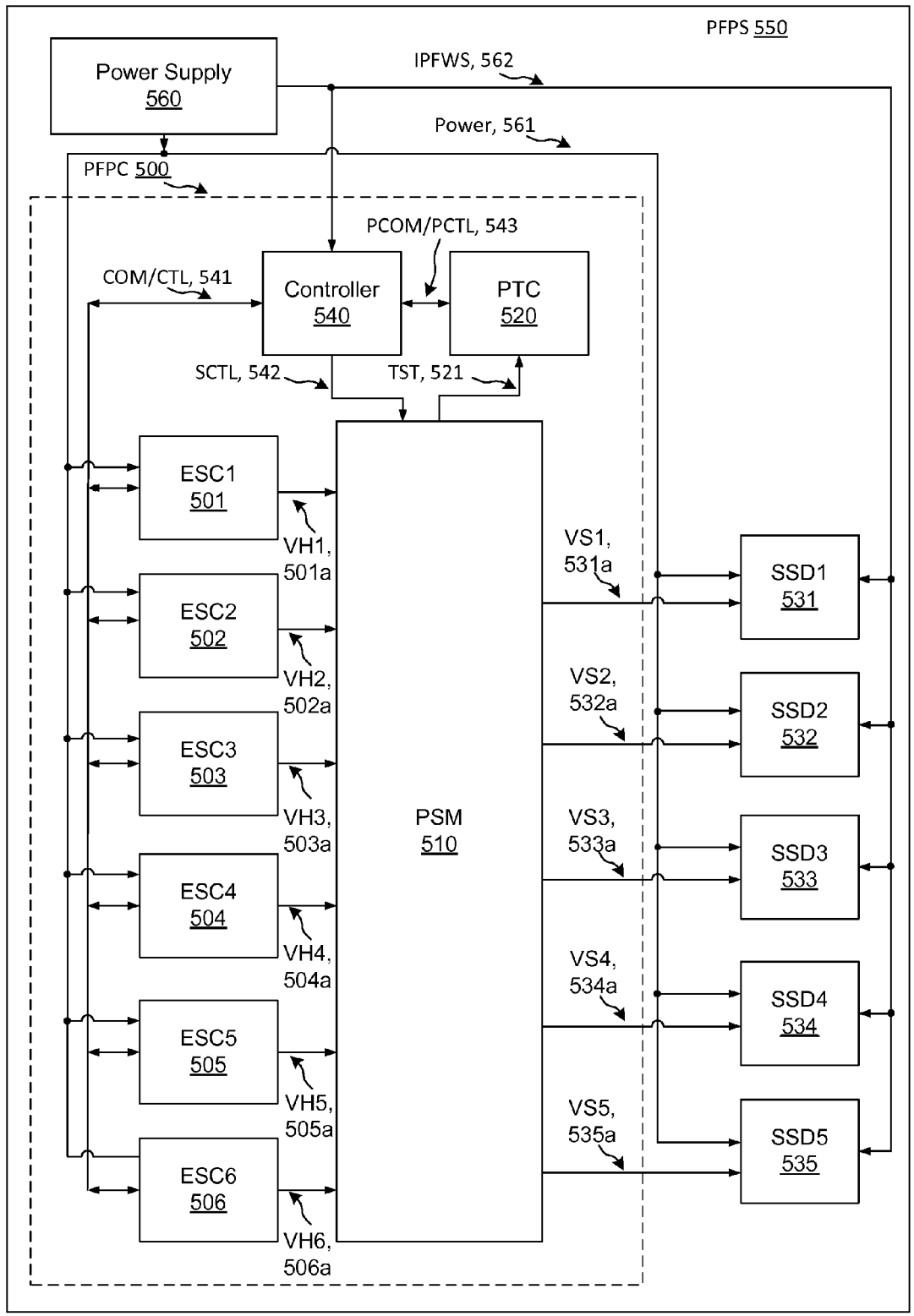
FIG. 7 illustrates an embodiment of a system having a power supply, PSM, PTC, controller, 6 ESC, and 5 SSD drives. The power supply is depicted as connecting power and communicating an imminent power fail warning signal to each SSD drive and each ESC.

Other exemplary embodiments of a Power Fail Protection System (PFPS) and a Power Fail Protection Circuit (PFPC) are depicted in FIG. 7, as detailed in the following. PFPS 550 comprises PFPC 500, Power Supply 560, and SSD1 through SSD5 (respectively 531, 532, 533, 534, and 535). PFPC 500 comprises ESC1 through ESC6 (respectively 501, 502, 503, 504, 505, and 506), Power Switch Matrix PSM 510, Power Test Circuitry PTC 520, and Controller 540. ESC1 through ESC6 are connected to PSM 510 through respective ESC output nodes VH1 501a, VH2 502a, VH3 503a, VH4 504a, VH5 505a, and VH6 506a. SSD1 through SSD5 are connected to PFPS 550 (and to PSM 510) through respective SSD input nodes VS1 531a, VS2 532a, VS3 533a, VS4 534a, and VS5 535a.

Power Supply 560 is connected to each ESC and to each SSD drive via Power 561. Power Supply 560 further outputs IPFWS 562 to Controller 540 and to each SSD drive. Controller 540 controls PSM 510 (to switch any of the ESC to any of the SSD, appropriately as required) though switch control SCTL 542 and communicates with each ESC via communication and control interface COM/CTL 541. Controller 540 also communicates with PTC 520 via power communication and control interface PCOM/PCTL 543. PSM 510 is enabled to electrically connect each ESC to PTC 520 via TST 521 (such as for periodic load discharge testing to evaluate the readiness status of each ESC).

Figure 8:
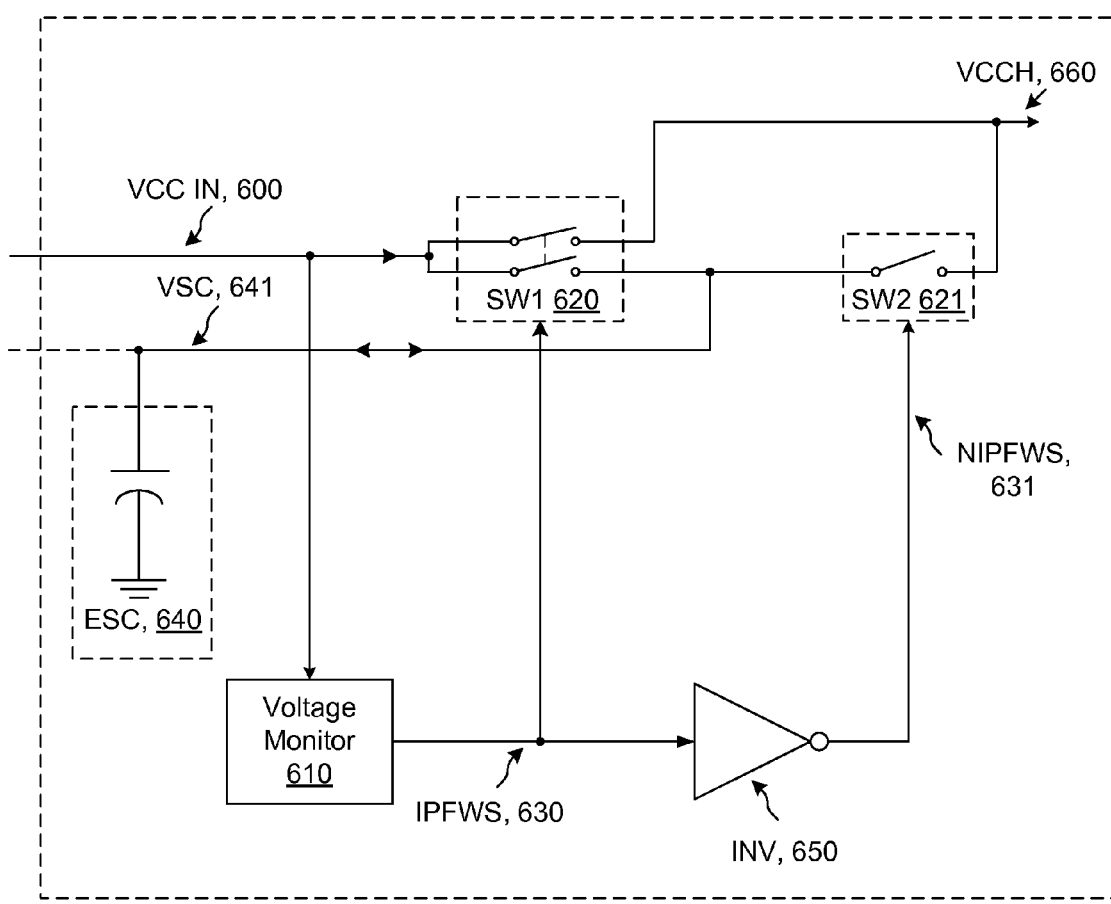
FIG. 8 illustrates an embodiment enabled to switch power to an output from a selected one of an input voltage and an ESC.

FIG. 8 is an illustrative switching circuit for an SSD (such as SSD1 531, of FIG. 7) enabled to provide power to SSD internal circuits (such as SSDC 731 of FIG. 4) connected to output node VCCH 660, the power being sourced via a selected one of node VCC IN 600 (such as Power 561 from Power Supply 560, of FIG. 7) and node VSC 641 (according to embodiment, such as from ESC 640, associated with the SSD; or from an output of a power switch matrix, such as VS1 531a of PSM 510, of FIG. 7). According to embodiment, ESC 640 is at least partially internal to the SSD (such as in the discussion for FIG. 4), or otherwise associated with the SSD. Switch SW1 620 in FIG. 8 is a double-pole-double-throw (DPDT) switch, which when closed electrically connects VCC IN 600 to both VCCH 660 and ESC 640 (where representative of a local ESC requiring charge maintenance). Locally generated Imminent Power Fail Warning Signal IPFWS 630 from Voltage Monitor 610 connects to SW1 620 and to inverter INV 650. When IPFWS 630 is inactive SW1 620 will be closed, and NIPFWS 631 (negative-IPFWS) will be active causing SW2 621 to open. Inverter INV 650 inverts input IPFWS 630 and provides output NIPFWS 631 to SW2 621. Voltage Monitor 610 monitors VCC IN 600 and drives IPFWS 630 active when VCC IN 600 drops below a specified minimum voltage (such as during a power failure). IPFWS 630 going active thus causes SW1 620 to open and SW2 621 to close, which enables power to be applied to VCCH 660 from output node VSC 641 instead of VCC IN 600. It is understood that in some embodiments the illustrated topology with respect to the coupling of the ESC to the regular power supply is simplified in that the ESC is isolated from the regular power supply during testing.

Example Implementation Techniques

In some embodiments, various combinations of all or portions of operations performed by a power fail protection system (such as PFPS of FIG. 8), power fail protection circuits (such as PFPC of FIGS. 3, 5, 6, and 7), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a power fail protection system (such as PFPS of FIG. 8), and power fail protection circuits (such as PFPC of FIGS. 3, 5, 6, and 7), are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as the number of energy storage components or solid state drives in a power fail protection system; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system, comprising:
   one or more solid state drives;
   a plurality of energy storage components; and
   switching circuitry selectively connecting the one or more solid state drives to at least one of the plurality of energy storage components;
   wherein the one or more solid state drives are initially enabled to perform data hardening without reliance on availability of any of the plurality of energy storage components;
   wherein when at least one of the plurality of energy storage components is unavailable, the switching circuitry enables available ones of the plurality of energy storage components during a power failure to provide short-term power sufficient to further enable the data hardening on the one or more solid state drives to complete.

2. The system of claim 1, wherein one or more of the plurality of energy storage components comprise capacitors implemented as hot-swappable removable modules comprising functional status visual indicators.

3. The system of claim 2, wherein the capacitors comprise tantalum capacitors.

4. The system of claim 2, wherein the capacitors comprise supercapacitors.

5. The system of claim 1, further comprising:
   load discharge test circuitry enabled to perform a periodic determination of a functional status of each of the plurality of energy storage components by observing a discharge performance during a respective periodic connection of each of the plurality of energy storage components to a predetermined test load; and
   wherein I/O operation performance, of the one or more solid state drives, is independent of the periodic determination without compromising the data hardening.

6. The system of claim 5, wherein the predetermined test load comprises a size chosen to implement the periodic determination faster than if the size were chosen to avoid stress of the plurality of energy storage components.

7. The system of claim 1, wherein the plurality of energy storage components are located within the system separately from the one or more solid state drives to avoid heat, and the one or more solid state drives are enabled to be smaller without compromising the data hardening.

8. The system of claim 7, wherein the data hardening is a latent feature of the one or more solid state drives, the latent feature is enabled by presence of the plurality of energy storage components, and the plurality of energy storage components are enabled to be provided as a subsequent field upgrade with respect to an earlier deployment of a plurality of storage drives.

9. The system of claim 1, wherein a count of the plurality of energy storage components is in excess number relative to a count of the one or more solid state drives and during the power failure each of the one or more solid state drives is connected to a respective one of the available ones of the plurality of energy storage components.

10. The system of claim 1, wherein the one or more solid state drives comprise a plurality of solid state drives and a count of the plurality of solid state drives is in excess number relative to a count of the available ones of the plurality of energy storage components, an excess in capacity of the available ones of the plurality of energy storage components exists relative to needs of the one or more solid state drives, and during the power failure at least one of the available ones of the energy storage components are connected to two or more of the plurality of solid state drives.

11. The system of claim 1, wherein the plurality of energy storage components are collectively implemented in a common housing compatible with a selected drive form factor, the one or more solid state drives are respectively compatible with the selected drive form factor, and the common housing of the plurality of energy storage components and the one or more solid state drives are removably mountable in respective drive bays of a multiple-drive-bay enclosure.

12. The system of claim 11, wherein the data hardening is a latent feature of the one or more solid state drives and the latent feature is enabled by later providing the plurality of energy storage components, comprised in the common housing of the plurality of energy storage components, via a field upgrade where the plurality of energy storage components are not provided initially.

13. A method, comprising:
periodically evaluating a plurality of energy storage components with respect to an ability to maintain a minimum voltage under a test load over a test time;
dynamically connecting, subsequent to a nominal power supply loss, the plurality of energy storage components that have the ability to maintain the minimum voltage to a plurality of storage drives;
data hardening initially by each of the plurality of storage drives, subsequent to the nominal power supply loss, without reliance on any of the plurality of energy storage components; and
data hardening by each of the plurality of storage drives using reserve power supplied from the dynamically connected plurality of energy storage components that have the ability to maintain the minimum voltage.

14. The method of claim 13, wherein the plurality of storage drives comprise one or more solid state drives and one or more of the plurality of energy storage components comprise supercapacitors implemented as hot-swappable removable modules comprising functional status visual indicators.

15. The method of claim 14, wherein the periodically evaluating is via load discharge test circuitry, the dynamically connecting is via a power switch matrix, the data hardening comprises writing data buffered in volatile storage to non-volatile storage, and in each of the one or more solid state drives the data hardening is managed by a solid state drive controller.

16. The method of claim 13, wherein an excess number of a count of the plurality of energy storage components, relative to a count of the plurality of storage drives, enables more frequent testing of the plurality of energy storage components without compromising I/O operation performance and without compromising the data hardening.

17. The method of claim 13, wherein the data hardening is a latent feature of the plurality of storage drives, the latent feature is enabled by presence of the plurality of energy storage components, and the plurality of energy storage components are enabled to be provided via a field upgrade at a time after an initial deployment of the plurality of storage drives.

18. The method of claim 13, further comprising:
generating at least one power status signal in accordance with predetermined criteria;
communicating the at least one power status signal to at least some of the plurality of storage drives via a pin on a standard computer interface; and
operating the plurality of storage drives in an operating mode determined based at least in part on changes in the power status signal;
wherein functionality of the pin is configured during system initialization for at least some of the plurality of storage drives.

19. The method of claim 18, wherein the at least one power status signal is an imminent-power-fail signal based at least in part on a status of the nominal power supply and the operating mode comprises performing the data hardening in response to the imminent-power-fail signal indicating the nominal power supply loss.

20. The method of claim 18, wherein the at least one power status signal is a reserve power ready signal based at least in part on a ready status of at least one of the plurality of energy storage components and the operating mode comprises deferring one or more operations in response to reserve power ready signal indicating a lack of readiness.

21. The method of claim 13, further comprising:
hot-swapping out evaluated as bad ones of the plurality of energy storage components.

22. The method of claim 18, further comprising:
further generating the at least one power status signal via comparator circuitry based at least in part on monitoring a user operated power-off switch;
wherein in response to assertion of the user operated power-off switch the at least one power status signal communicates a power loss event in advance of a shutdown of the nominal power supply.

* * * * *